United States Patent
Goldstein

(10) Patent No.: US 12,221,208 B2
(45) Date of Patent: Feb. 11, 2025

(54) SELF-FOLDING PROPELLER

(71) Applicant: Skydio, Inc., San Mateo, CA (US)

(72) Inventor: Ryan Goldstein, San Francisco, CA (US)

(73) Assignee: Skydio, Inc., San Mateo, CA (US)

( * ) Notice: Subject to any disclaimer, the term of this patent is extended or adjusted under 35 U.S.C. 154(b) by 20 days.

(21) Appl. No.: 18/083,669

(22) Filed: Dec. 19, 2022

(65) Prior Publication Data

US 2023/0303242 A1 Sep. 28, 2023

Related U.S. Application Data

(63) Continuation of application No. 16/751,324, filed on Jan. 24, 2020, now Pat. No. 11,535,369, which is a continuation of application No. 15/455,132, filed on Mar. 10, 2017, now Pat. No. 10,543,915.

(51) Int. Cl.
| | |
|---|---|
| B64C 27/50 | (2006.01) |
| B64C 11/28 | (2006.01) |
| B64U 10/13 | (2023.01) |
| B64U 30/293 | (2023.01) |

(52) U.S. Cl.
CPC .............. B64C 27/50 (2013.01); B64C 11/28 (2013.01); B64U 10/13 (2023.01); B64U 30/293 (2023.01)

(58) Field of Classification Search
CPC ....... B64C 27/50; B64C 11/28; B64C 39/024; B64U 10/13; B64U 30/20; B64U 30/293
See application file for complete search history.

(56) References Cited

U.S. PATENT DOCUMENTS

| | | |
|---|---|---|
| 1,445,402 A | 2/1923 | Le Velle |
| 9,284,962 B2 | 3/2016 | Long |
| 9,540,103 B2 | 1/2017 | Long |
| 9,612,599 B2 | 4/2017 | Bradlow |
| 10,392,104 B1 | 8/2019 | Urban |
| 10,543,915 B2 | 1/2020 | Goldstein |
| 10,669,869 B1 | 6/2020 | Urban |
| 10,994,829 B2 | 5/2021 | Duffy |
| 11,040,772 B2 | 6/2021 | Reddy |
| 11,117,649 B2 | 9/2021 | Alley |
| 2016/0001879 A1 | 1/2016 | Johannesson |

(Continued)

FOREIGN PATENT DOCUMENTS

CN 206407129 U 8/2017

OTHER PUBLICATIONS

Brusso Stop Hinge, 2013, https://www.brusso.corn/jb-101s/, 4 pages.

*Primary Examiner* — Courtney D Heinle
*Assistant Examiner* — Andrew Thanh Bui
(74) *Attorney, Agent, or Firm* — Young Basile Hanlon & MacFarlane, P.C.

(57) ABSTRACT

An unmanned aerial vehicle including a propeller blade and a central hub. The propeller blade includes a hole, and a connector located at a root of the propeller blade, the connector including a projection and a shoulder. The central hub includes an opening configured to receive the projection; a portion of a face, wherein the shoulder engages with the portion of the face in a first rotational position of the propeller blade and holes. The holes of the propeller blade and the central hub are concentric so that the propeller blade is movably connected to the central hub via the holes.

20 Claims, 7 Drawing Sheets

(56) References Cited

U.S. PATENT DOCUMENTS

| | | | |
|---|---|---|---|
| 2016/0167778 A1* | 6/2016 | Meringer | B64U 30/293 |
| | | | 244/17.11 |
| 2016/0179096 A1* | 6/2016 | Bradlow | G05D 1/102 |
| | | | 701/8 |
| 2017/0283050 A1 | 10/2017 | Baek | |
| 2018/0037311 A1 | 2/2018 | Tian | |
| 2018/0257769 A1 | 9/2018 | Goldstein | |
| 2020/0277046 A1 | 9/2020 | Goldstein | |

* cited by examiner

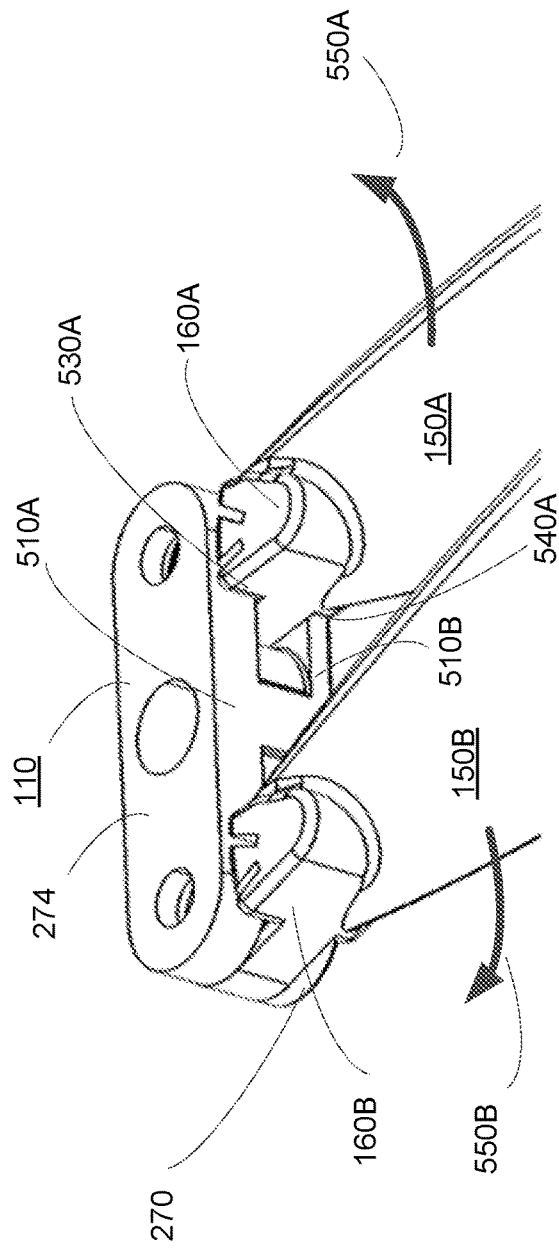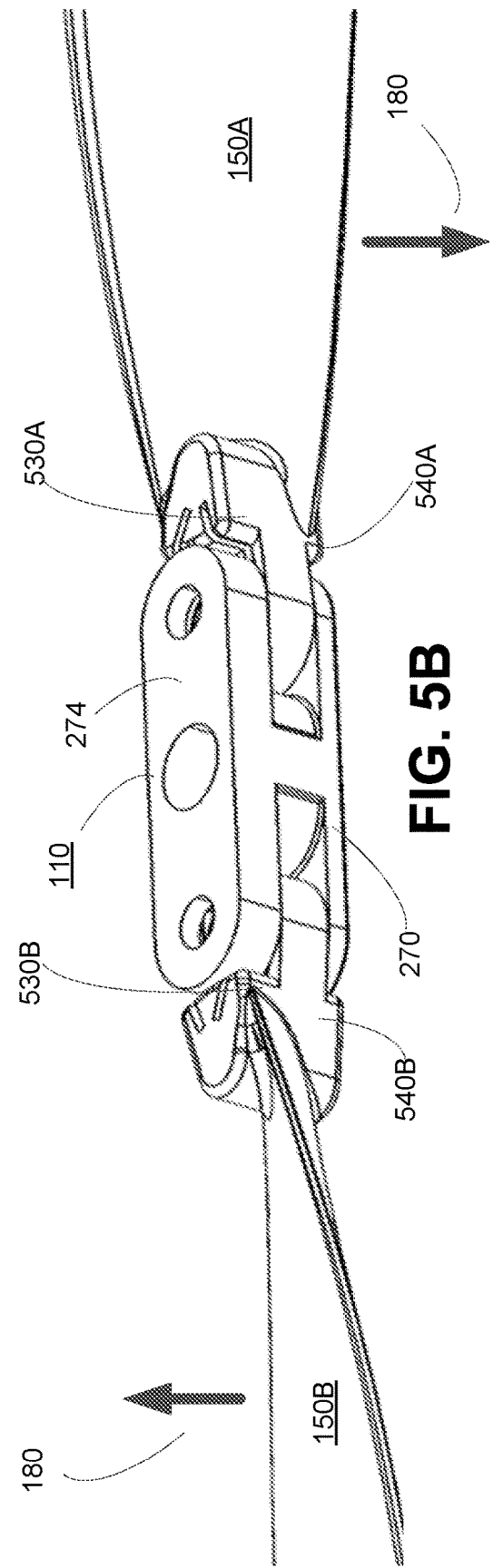
FIG. 5A
FIG. 5B

SELF-FOLDING PROPELLER

CROSS REFERENCE TO RELATED APPLICATION(S)

This application is a continuation of U.S. application Ser. No. 16/751,324, filed Jan. 24, 2020, which is a continuation of U.S. application Ser. No. 15/455,132, filed Mar. 10, 2017, now U.S. Pat. No. 10,543,915, the contents of which are incorporated by reference in their entirety.

TECHNICAL FIELD

This disclosure relates to propeller blades, and more specifically, a-folding propeller blade for an aerial vehicle.

BACKGROUND

Propeller blades of a propeller assembly are extended when in flight in order to provide sufficient thrust to achieve flight in unmanned aerial vehicles (UAV or drones). Propeller based unmanned aerial vehicles also may be referenced as rotary wing vehicles, for example, quadcopters. When at rest, propeller blades are often large and unwieldy in the extended configuration and thereby require significant space to adequately store the propeller blades and corresponding unmanned aerial vehicle. Conventional strategies to try to reduce an at rest propeller footprint have involved folding the propellers. However, these strategies require human intervention to fold and unfold the propeller. For example, an individual applies a force to fold propeller blades for storage or applies a force to extend the propeller blades for a flight configuration. In each instance, human intervention increases a likelihood of potential issues such as human error and/or subsequent improper mechanical setup of the propeller assembly.

SUMMARY

An unmanned aerial vehicle including a propeller blade and a central hub. The propeller blade includes a hole, and a connector located at a root of the propeller blade, the connector including a projection and a shoulder. The central hub includes an opening configured to receive the projection; a portion of a face, wherein the shoulder engages with the portion of the face in a first rotational position of the propeller blade and holes. The holes of the propeller blade and the central hub are concentric so that the propeller blade is movably connected to the central hub via the holes.

A propeller assembly including: a first blade, a second blade, and a central hub. The first blade is movable between a folded state and a flight state, the first blade including: a first connector comprising a top structure. The second blade is movable between the folded state and the flight state, the second blade including: a second connector comprising a top structure. The central hub includes a first opening, a face, and a second opening. The first opening is configured to receive an end of the first blade and the first connector. The face is configured to contact the top structure of the first connector when the first blade is in the folded state. The second opening is configured to receive a first end of the first blade and the first connector. The face contacts the top structure of the second connector when the second blade is in the folded state.

A propeller assembly including a first blade, a second blade, and a central hub. The central hub includes a bottom component; a top component connected to the bottom component; a first hinge pin, and a second hinge pin. The first hinge pin extends through the top component and the bottom component at a first end of the central hub to movably connect the first blade to the first end of the central hub. The second hinge pin extending through the top component and the bottom component at a second end of the central hub to movably connect the second blade to the second end of the central hub.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIG. 5A depicts the position of the propeller blades 150 in a folded state in relation to the central hub 110, in accordance with an example embodiment.

FIG. 5B depicts the position of the propeller blades 150 in a flight state in relation to the central hub 110, in accordance with an example embodiment.

DETAILED DESCRIPTION

Figure 1A:
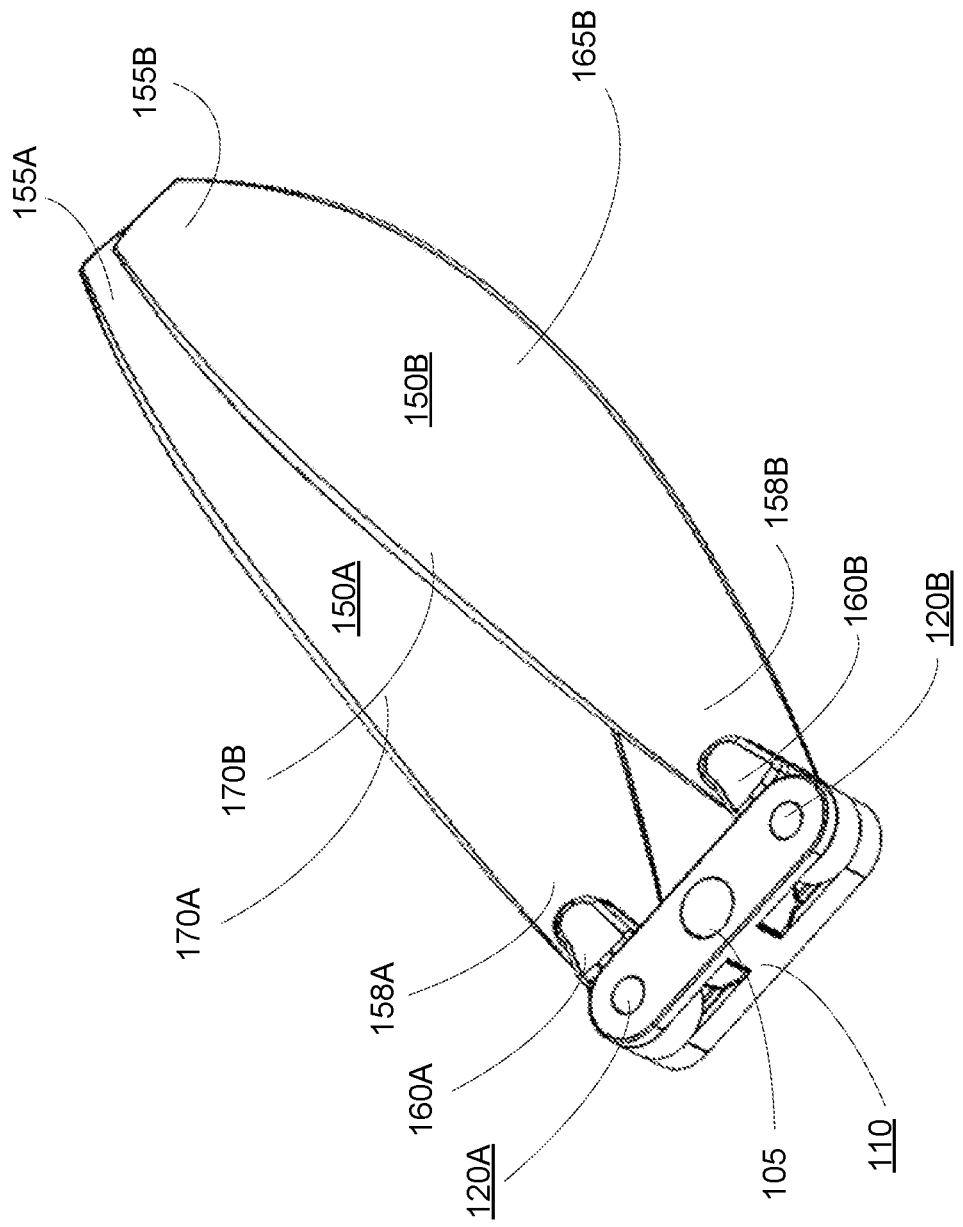
FIG. 1A illustrates a propeller assembly in a folded state, in accordance with an example embodiment.

The figures and the following description relate to preferred embodiments by way of illustration only. It should be noted that from the following discussion, alternative embodiments of the structures disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system for purposes of illustration only. One skilled in the art will readily recognize from the following description that alternative embodiments of the structures illustrated herein may be employed without departing from the principles described herein.

The figures use like reference numerals to identify like elements. A letter after a reference numeral, such as "150A," indicates that the text refers specifically to the element having that particular reference numeral. A reference numeral in the text without a following letter, such as "150," refers to any or all of the elements in the figures bearing that reference numeral (e.g. "propeller blade 150" in the text refers to reference numerals "propeller blade 150A" and/or "propeller blade 150B" in the figures).

Overview Configuration

Disclosed by way of example embodiments is a propeller assembly that may include propeller blades that self-fold when not in use, thereby minimizing the overall footprint of the propeller assembly. When required, such as during flight conditions (e.g., as the propeller blades rotate), the propeller blades naturally extend to a flight configuration to enable the generation of lift due to centrifugal forces imparted on the propeller blades. Therefore, the propeller assembly can achieve the needed configuration without the need for human intervention. Such a propeller assembly may be attached to an unmanned rotary winged aerial vehicle, e.g., a quadcopter. For ease of discussion, the disclosure will be described with respect to a rotary winged aerial vehicle (or aerial vehicle) configuration that may be a quadcopter, but the principles herein can apply to other rotary winged aerial vehicles, e.g., having two blades, three blades or more than 4 blades.

Example Propeller Assembly

Reference is now made to Figure (FIG. 1A, which illustrates a propeller assembly 100 in a folded state, in accordance with an example embodiment. The propeller assembly 100 may include a first propeller blade 150A, a second propeller blade 150B, a first hinge pin 120A, a second hinge pin 120B, and a central hub 110. Furthermore, the propeller assembly 100 also may include a first and second spring element (not shown in FIG. 1A).

Each propeller blade 150 may be connected to a central hub 110. In one example embodiment, the first propeller blade 150A includes a connector 160A on one end of the first propeller blade 150A that couples with the central hub 110 through the first hinge pin 120A. Similarly, the second propeller blade 150B includes a connector 160B on one end of the second propeller blade 150B that couples with the central hub 110 through the second hinge pin 120B. In various example embodiments, the central hub 110 further includes an attachment point 105 configured to attach the central hub 110 to a motor of an aerial vehicle. The attachment point 105 of the central hub 110 may be a screw thread, snap-fit, magnetic attachment or any other type of attachment that couples with a motor of the aerial vehicle. Therefore, driving (e.g., spinning) the motor causes a corresponding rotation of the central hub 110 and the attached propeller blades 150.

In various embodiments, each propeller blade 150 includes a tip 155 and a root 158. Specifically, the connector 160 of each propeller blade 150 may be located near the root 158 of the propeller blade 150. Additionally, each propeller blade 150 may be designed with a leading edge 165 and a trailing edge 170. The leading edge 165B of the second propeller blade 150B is depicted in FIG. 1A whereas the leading edge 165A of the first propeller blade 150A is located underneath the second propeller blade 150B and is not labeled. Even though FIG. 1A depicts two separate propeller blades 150A and 150B, in some embodiments, the propeller assembly 100 may include three, four, or more propeller blades 150, each coupled to central hub 110 via a connector 160 of each propeller blade 150.

In various embodiments, the folded state refers to the propeller assembly 100 at rest (e.g., when no external forces are applied on the propeller assembly 100). Each propeller blade 150 may be placed in this first position (e.g., the folded state) due to the corresponding spring element (not shown in FIG. 1A), which is described in further detail below. When the propeller assembly 100 is in the folded state, as depicted in FIG. 1A, the propeller blades 150 of the propeller assembly 100 are positioned such that the overall footprint of the propeller assembly 100 is reduced as compared to the overall footprint of the propeller assembly 100 when in a flight state. A flight state of the propeller assembly 100 is described further in regards to FIG. 1C.

For example, in the folded state, at least a portion of the first propeller blade 150A may be nested underneath a portion of the second propeller blade 150B. For example, a portion of the leading edge 165A and tip 155A of the first propeller blade 150A reside underneath the second propeller blade 150B. Other example embodiments may involve different configurations such that different portions of the first propeller blade 150A are nested underneath a second propeller blade 150B or vice versa.

Figure 1B:
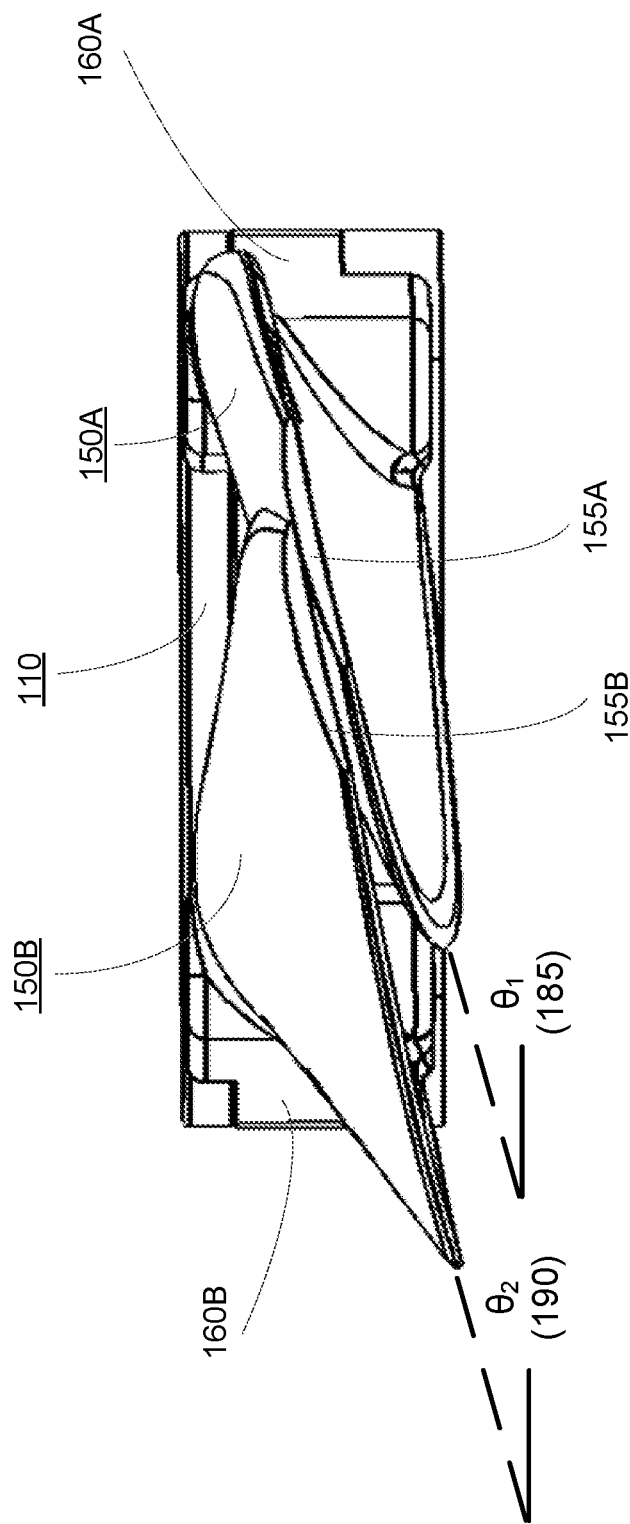
FIG. 1B is a sideview of the propeller blades of the propeller assembly in the folded state, in accordance with an example embodiment.

Reference is now made to FIG. 1B, which illustrates a sideview of the propeller blades 150 of the propeller assembly 100 in the folded state, in accordance with an example embodiment. Each propeller blade 150 may be designed with a twist along the length of the propeller blade 150 that enables the generation of lift and furthermore, enables portions of the first propeller blade 150A to reside underneath the second propeller blade 150B in the folded state. For example, the first propeller blade 150A may be designed with a first angle of attack $\theta_1$ (185) at the tip 155A of the first propeller blade 150A whereas the second propeller blade 150B may be designed with a second angle of attack $\theta_2$ (190) at the tip 155B of the second propeller blade 150B. In various embodiments, the first angle of attack $\theta_1$ (185) may be equal to the second angle of attack $\theta_2$ (190) at the tip 155 of each propeller blade 150. In various example embodiments, the angle of attack of the first propeller blade 150A and second propeller blade 150B may vary along the length of each propeller blade 150 to enable a portion of the first propeller blade 150A to nest underneath the second propeller blade 150B.

Figure 1C:
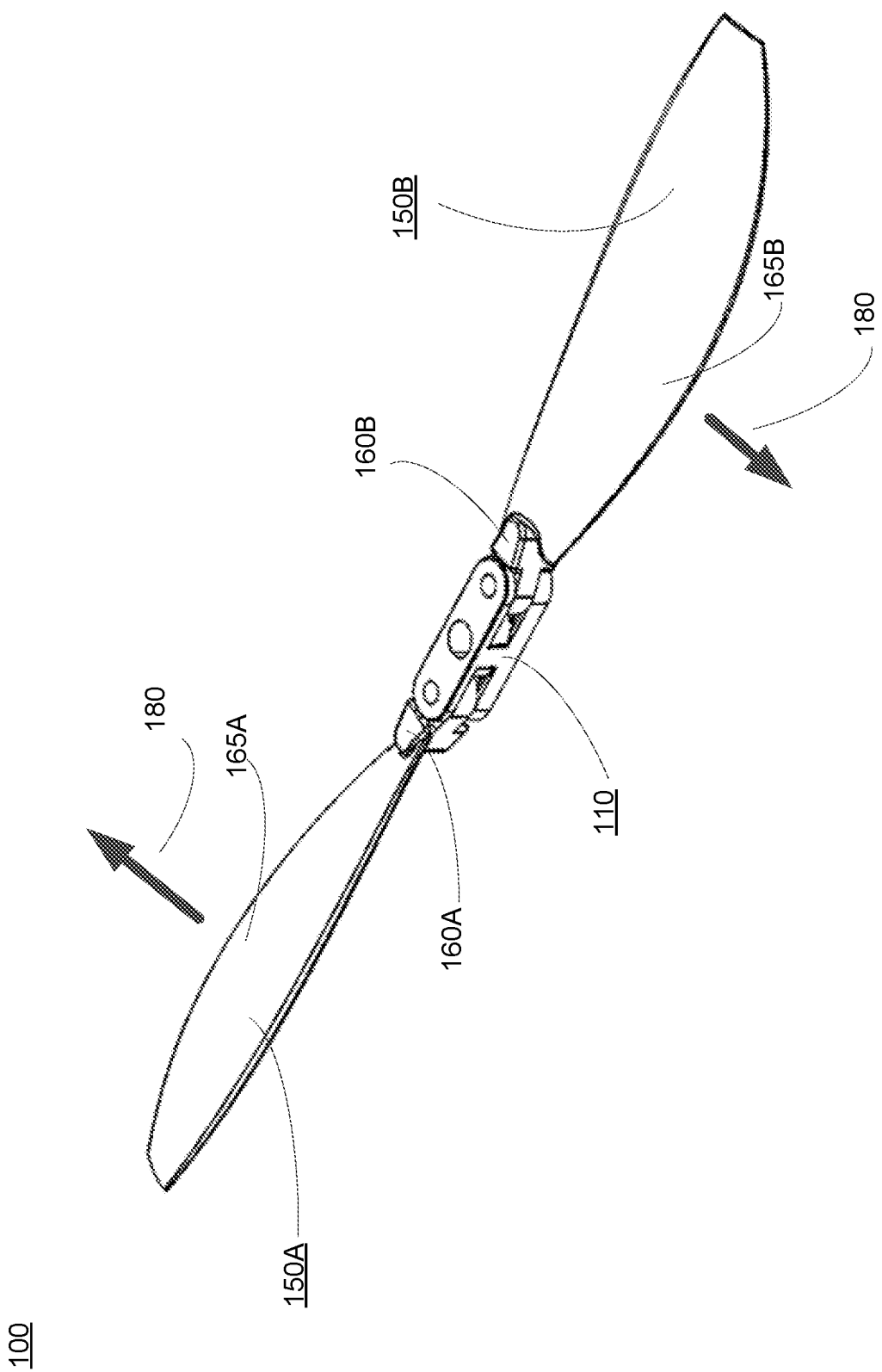
FIG. 1C illustrates a propeller assembly in a flight state, in accordance with an example embodiment.

FIG. 1C illustrates a propeller assembly 100 in a flight state, in accordance with an example embodiment. In various embodiments, the flight state refers to the propeller assembly 100 during flying conditions (e.g., when the propeller assembly 100 is driven by an attached motor to rotate). For example, during flying conditions, the propeller blades 150 of the propeller assembly 100 rotate and lift is generated on the propeller blades 150 (and consequently the aerial vehicle that the propeller assembly 100 is attached to). As displayed in FIG. 1C, the propeller blades 150 in this example configuration rotate in a clockwise fashion such that the leading edge 165 of each propeller blade 150 meets the air.

The transition from the folded state, as depicted in FIG. 1A, to the flight state, as depicted in FIG. 1C, may occur as the propeller assembly 100 is driven by an attached motor to begin spinning the propeller blades 150. To make the transition, the first propeller blade 150A may rotate counterclockwise relative to the central hub 110 around the first hinge pin 120A. The second propeller blade 150B may similarly transition by rotating in a clockwise direction relative to the central hub 110 around the second hinge pin 120B. In various example embodiments, the rotation of each propeller blade 150 relative to the central hub 110 when transitioning from the folded state to the flight state may be caused by centrifugal forces acting on each propeller blade 150 as the propeller assembly 100 is driven by the attached motor. Further details regarding the transitioning of a propeller blade 150 from a folded state to a flight state, and vice versa, is described in further detail below in regards to FIG. 5.

Example Components of the Propeller Assembly

Figure 2:
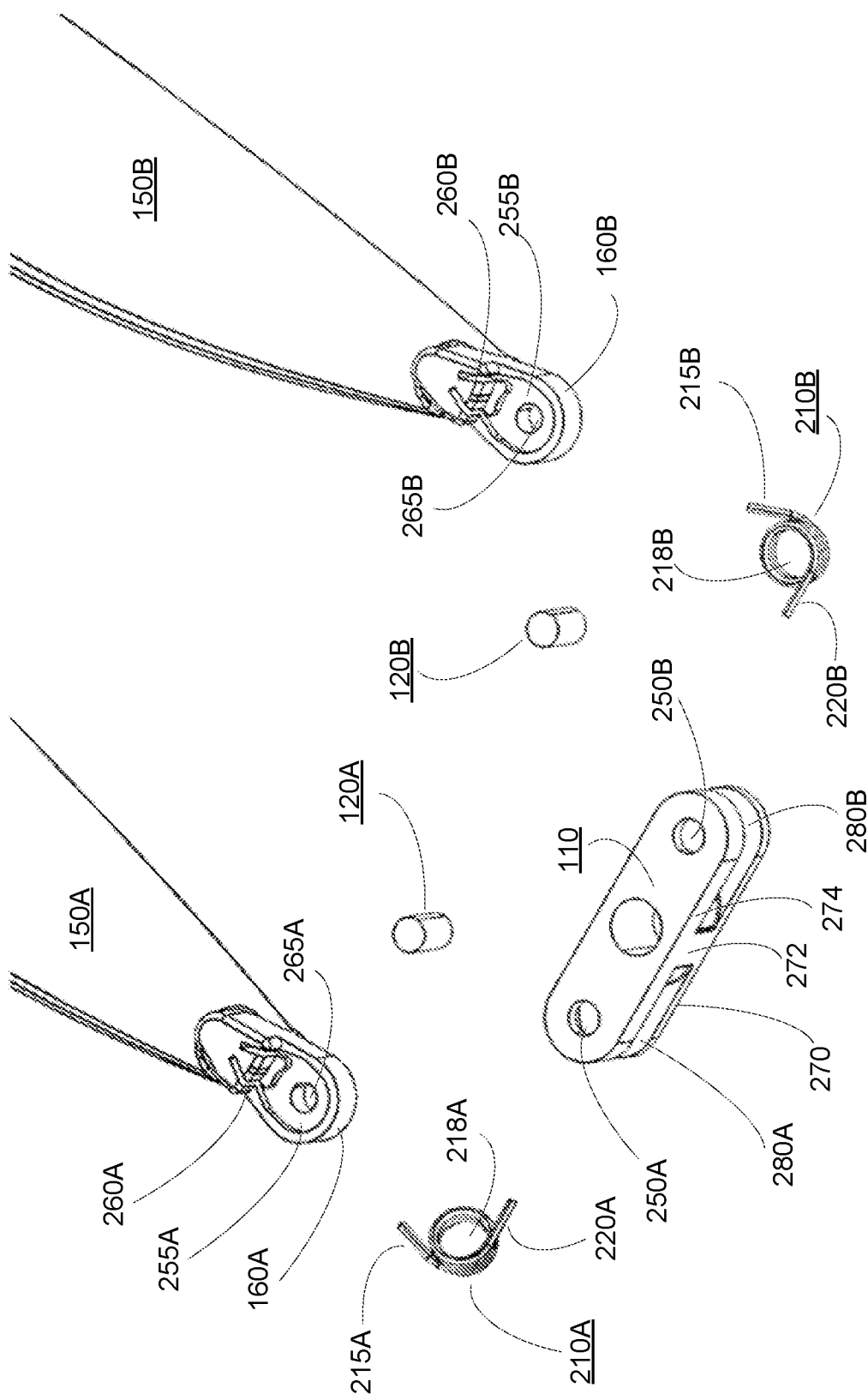
FIG. 2 illustrates an exploded view of the components in the propeller, in accordance with an example embodiment.

FIG. 2 illustrates an exploded view of example components in the propeller assembly 100, in accordance with an example embodiment. The components in the propeller assembly 100 may include the first propeller blade 150A, second propeller blade 150B, the central hub 110, a first spring element 210A, a second spring element 210B, a first hinge pin 120A, and a second hinge pin 120B. Referring to each component individually, each propeller blade 150 may include a connector 160 which may further include a cavity 255, a recess 260 and a hole 265. The central hub 110 may include a top component 274, a bottom component 270, and a midsection 272 that connects the top component 274 to the bottom component 270. The central hub 110 may further include multiple holes 250 located on the top component 274. In various example embodiments, the bottom component 270 also may include holes substantially aligned with the holes 250 of the top component 274. Each spring element 210 may further include a first arm 215, a second arm 220, and a gap 218 within the spring element 210.

Referring specifically now to the elements of the connector 160 of the propeller blade 150, the cavity 255 of the connector 160 may be configured to receive the spring element 210. For example, the cavity 255 may be shaped to correspond to the spring element 210 such that when the spring element 210 resides in the cavity 255, the spring element 210 is restricted from translational movement due to the elevated walls around the cavity 255. For example, FIG. 2 depicts a cavity 255 of the connector 160 that is round in shape. Therefore, the diameter of the cavity 255 may be slightly larger than the diameter of the spring element 210.

Each recess 260 in the connector 160 may be in connection with a corresponding cavity 255 and located proximal to the tip 155 of the propeller blade 150 relative to the cavity 255. The recess 260 of the connector 160 may be configured to receive a first arm 215 of the spring element 210. In various embodiments, the recess 260 may be shaped to receive the first arm 215. For example, the recess 260 may be a slit in the connector 160 that corresponds to the shape of the first arm 215 and may couple with the first arm 215 through adhesives and/or mechanical connectors. In some example embodiments, the recess 260 may be directed along the length of the propeller blade 150 such that centrifugal forces generated on the propeller blade 150, when the propeller assembly 100 rotates, transfer to the first arm 215 of the spring element 210 and cause the spring element 210 to further untwist.

Each hole 265 of the connector 160 may reside within the cavity 255 of the connector 160. For example, given that the cavity 255 is circular, the hole 265 may be situated at the center of the cavity 255. In various example embodiments, the hole 265 passes from a top surface of the connector 160 through to a bottom surface of the connector 160. Therefore, the hole 265 may be configured to receive a hinge pin 120. Additionally, when the spring element 210 resides within the cavity 255, the hole 265 of the connector 160 may substantially align with the gap 218 of the spring element 210.

Referring to the elements of the central hub 110, the top component 274 and the bottom component 270 may be parallel to one another and connected through a midsection that is perpendicular to both the top 274 and bottom component 270. As such, the top component 274 and the bottom component 270 may form a first opening 280A and a second opening 280B, each opening 280 located between the top component 274 and bottom component 270. The first opening 280A may be configured to receive the connector 160A of the first propeller blade 150A whereas the second opening 280B may be configured to receive the connector 160B of the second propeller blade 150B. More specifically, each opening 280 may be designed such that when the connector 160 of each propeller blade 150 resides within the opening 280, a hole 250 (e.g., 250A or 250B) of the top component 274 of the central hub 110 substantially aligns with the hole 265 (e.g., 265A or 265B, respectively) of the connector 160 of the propeller blade 150.

Referring to the first spring element 210A and second spring element 210B, each spring element 210 may be a linear spring or may employ alternative stored energy methods to enable the transition of the propeller blades 150 between the folded and flight state. In an embodiment, each spring element 210 may be a helical torsion spring element. The first spring element 210A and the second spring element 210B may be differently wound. For example, as depicted in FIG. 2, the first spring element 210A is a right-hand wound torsion spring whereas the second spring element 210B is a left-hand wound torsion spring. The spring elements 210 enable each of the propeller blades 150 to transition between the folded state, as shown in FIG. 1A, and the flight state, as shown in FIG. 1C. In various embodiments, the spring constant of each spring element 210 may depend upon the diameter of the corresponding propeller blade 150. For example as the diameter of the propeller blade 150 increases, the corresponding spring element 210 may have a higher spring constant.

As previously described, the first arm 215 of each spring element 210 may be attached to the recess 260 of the connector 160 of the propeller blade 150. The second arm 220 of each spring element 210 may be coupled to the central hub 110. Therefore, rotation of the propeller blade 150 relative to the central hub 110 may cause a twisting or untwisting of the spring element 210.

Figure 3:
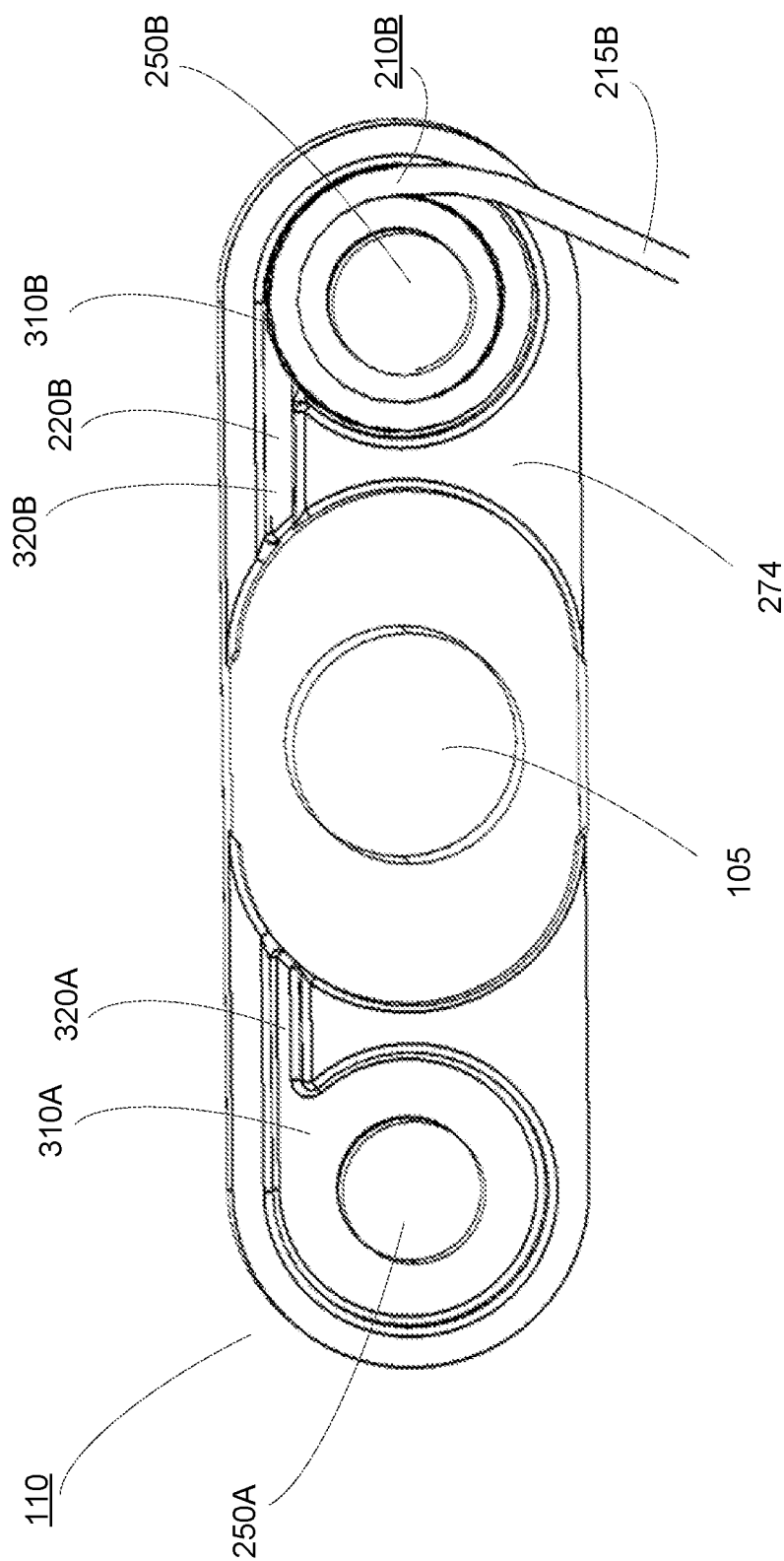
FIG. 3 illustrates the assembly of a spring and with a top component of the central hub, in accordance with an example embodiment.

Reference is now made to FIG. 3, which illustrates the assembly of a spring 210B with the top component 274 of the central hub 110, in accordance with an example embodiment. More specifically, FIG. 3 depicts a cross-sectional view of the underside of the top component 274 of the central hub 110 that includes a spring element 210B located within a cavity 310B of the top component 274. Although FIG. 3 only depicts a second spring element 210B within a cavity 310B, one may appreciate that a first spring element 210A may also reside within the corresponding cavity 310A.

In various example embodiments, each cavity 310 of the top component 274 may be designed to correspond to the shape of the spring element 218. For example, the cavity 310 of the top component 274 may be circular in shape with a diameter that can receive the diameter of the spring element 210. Additionally, the cavity 310 may further include a portion that is configured to receive the second arm 220 of the spring element 210. For example, the cavity 310 may include a slot 320 that couples with the second arm 220. The slot 320 may couple with the second arm 220 through adhesives and/or mechanical connectors. In various example embodiments, when the spring element 210 is situated in the cavity 320 of the top component 274 of the central hub 110, the gap 218 of the spring element 210 substantially aligns with the hole 250 of the top component 274 of the central hub 110.

Figure 4:
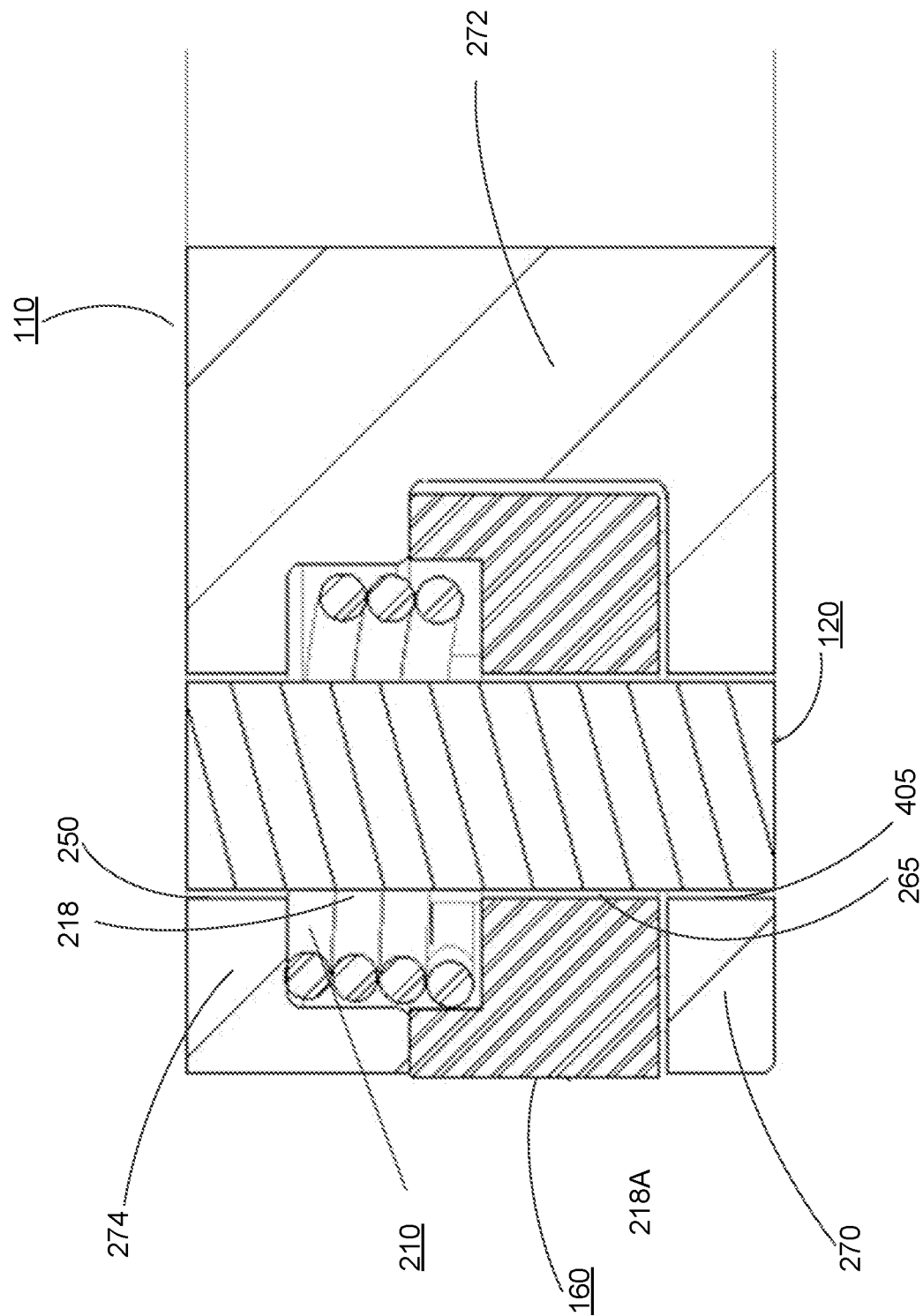
FIG. 4 is a cross-sectional view of the hinged joint of the propeller assembly, in accordance with an example embodiment.

This is further illustrated in FIG. 4, which depicts a cross-sectional view of the hinged joint of the propeller assembly 100, in accordance with an example embodiment. For example, the hole 250 of the top component 274 of the central hub 110 may align with the gap 218 of the spring element 210, which further aligns with the hole of the hole 265 of the connector 160. In various embodiments, the bottom component 270 of the central hub 110 may also include a hole 405, which substantially aligns with a hole 250 of the top component 274, a gap 218 of the spring element 218, and a hole 265 of the connector 160. A hinge pin 120 may thread through, from top to bottom, the hole 250 of the top component 274, the gap 218 of the spring element 210, the hole 265 of the connector 160, and the hole 405 of the bottom component 270. In various example embodiments, the hinge pin 120 may be cylindrical in shape to correspond to each hole 250/265 and gap 218 that the hinge pin 120 threads through.

In various example embodiments, the diameters of the hole 250 of the top component 274, the gap 218 of the spring element 210, the hole 265 of the connector 160, and hole 405 of the bottom component 270 are each designed such that the hinge pin 120 rotatably couples the connector 160 of the propeller blade 150 to the central hub 110. For example, the hole 250 of the top component 274 and the hole 405 of the bottom component may each have a diameter that matches or nearly matches the diameter of the hinge pin 120 such that the hinge pin 120 is in contact with the top component 274 and the bottom component 270. Therefore, the central hub 110 does not rotate relative to the hinge pin 120. Alternatively, the diameter of the gap 218 of the spring element and the diameter of the hole 265 of the connector may each be larger than the hole 250 of the top component 274 and the hole 405 of the bottom component. As such, the spring element 218 may twist or untwist while the connector 160 of the propeller blade 150 may rotate relative to the hinge pin 120 and the central hub 110.

Transitioning Between the Folded State and the Flight State

FIG. 5A depicts the position of the propeller blades 150 in a folded state in relation to the central hub 110, in accordance with an example embodiment. FIG. 5B depicts the position of the propeller blades 150 in a flight state in relation to the central hub 110, in accordance with an example embodiment. Further reference will be made to individual components of the propeller assembly 100, most notably the first spring element 210A and second spring element 210B depicted in FIG. 3.

In various example embodiments, when in the folded state, the longitudinal axis of each propeller blade 150 may be perpendicular or near perpendicular (e.g., 90°±10°) relative to the longitudinal axis of the central hub 110. The spring element 210 corresponding to each propeller blade 150 may be responsible for holding the propeller blade 150 in a folded state. For example, when each propeller blade 150 is at rest in the folded state, as depicted in FIG. 5A, each spring element 210 may be in an untwisted state. In this untwisted state, the first spring element 210A may provide a clockwise torque to the connector 160A of the first propeller 150A through the first arm 215A of the first spring element 210A. Similarly, the second spring element 210B may provide a counter-clockwise torque to the connector 160B of the second propeller 150B through the first arm 215B of the second spring element 210B. To achieve the rotational configuration of the first propeller blade 150A and second propeller blade 150B in the folded state, the torque applied by each spring element 210 may be counteracted by an equal and opposite torque applied by one or more structural detents on the central hub 110. For example, the top component 274 and bottom component 270 of the central hub 110 may include a face 510A and 510B, respectively.

Referring to the first propeller blade 150A in FIG. 5A, the face 510A of the top component 274 may contact a top structure 530A of the connector 160A of the first propeller blade 150A whereas the face 510B of the bottom component 274 may contact a bottom structure 540A of the connector 160A of the first propeller blade 150A. Although not explicitly shown in FIG. 5A, the face 510A of the top component 274 may also contact a top structure 530B (not shown) of the connector 160B of the second propeller blade 150B. Similarly, the face 510B of the bottom component 270 may also contact a bottom structure 540B (not shown) of the connector 160B of the second propeller blade 150B. Therefore, each spring element 210 and the faces 510 of the top 274 and bottom components 270 apply counteracting forces that hold each propeller blade 150 in its rotational configuration in the folded state.

FIG. 5A also depicts the directional rotation of each propeller blade 150 as they transition from a folded state to the flight state. Namely, the first propeller blade 150A rotates in a counterclockwise 550 direction whereas the second propeller blade 150B rotates in a clockwise 550B direction. During this transition, each spring element 210 (located between each connector 160 and the central hub 110) is in tension such that the force applied by each spring element 210 acts in an opposite direction that each propeller blade 150 rotates.

Referring now to FIG. 5B which depicts the propeller blades 150 in a flight state, in various embodiments, the longitudinal axis of each propeller blade 150 may be parallel or nearly parallel (e.g., 0°±10°) relative to the longitudinal axis of the central hub 110. In other example embodiments, when in the flight state, the longitudinal axis of each propeller blade 150 and the longitudinal axis of the central hub 110 may align. As depicted in FIG. 5B, the propeller assembly 100 may achieve a clockwise spin 180. Referring to the spring elements 210 in the propeller assembly 100 when in the flight state, the first spring element 210A (between first propeller blade 150A and central hub 110) may be in tension and may apply a torque on the first propeller blade 150A that is in the same direction as the clockwise propeller assembly spin 180. The second spring element 210B (between second propeller blade 150B and central hub 110) may be in tension and may apply a torque on the second propeller blade 150B that is in an opposite direction as the clockwise propeller assembly spin 180.

When each propeller blade 150 is in the flight state, each spring element 210 may be further untwisted (e.g., in further tension and storing additional potential energy) when in the flight state as compared to when in the folded state. Therefore, each propeller blade 150 may transition from a folded state to a flight state when a threshold amount of external force overcomes the directional torque applied by each spring element 210 on the propeller blade 150.

In various embodiments, the external force corresponds to the centrifugal force imparted on each propeller blade 150 as the propeller assembly 100 begins to spin. Given that centrifugal force is a function of the square of the angular velocity, the centrifugal force imparted on each propeller blade 150 increases as the propeller assembly 100 increases in rotational velocity. The centrifugal force may be directed along the length of each propeller blade 150 outward from the central hub 110 and as such, is translated to the first arm 215 (e.g., see FIG. 2) that is attached to the connector 160 of each propeller blade 150. More specifically, the centrifugal force translated to each spring element 210 may be directed along the length of each first arm 215, thereby causing each spring element 210 to further untwist (e.g., untwist beyond its current untwisted state when in the folded state). The untwisting of the first spring element 210A may cause the first propeller blade 150A to rotate in a counterclockwise direction whereas the untwisting of the second spring element 210B may cause the second propeller blade 150B to rotate in a clockwise direction.

In various example embodiments, the rotational configuration of the propeller blades 150 in the flight state, as depicted in FIG. 5B, is determined by a balance of torques. For example, each spring element 210 may be designed with a spring constant such that the torque applied by each spring element 210 onto the first arm 215 is equal and directionally opposite of the torque applied onto the first arm 215 by the centrifugal forces. Given that centrifugal forces are a function of the square of angular velocity, each spring element 210 may be designed with a spring constant such that the rotational configuration of the propeller blades 150 in the flight state is achieved at a particular angular velocity. Therefore, as the rotational velocity of the propeller assembly 100 increases from rest (e.g., zero angular velocity) to that particular angular velocity, the rotational configuration of each propeller blade 150 transitions from the folded state, as depicted in FIG. 5A to the flight state, as depicted in FIG. 5B.

In other example embodiments, the rotational configuration of the propeller blades 150 in the flight state is achieved by employing structural detents that prevent the first propeller blade 150A from further rotating in a counter-clockwise direction and that prevent the second propeller blade 150B from further rotating in a clockwise direction. The structural detents may be located on the center hub 110 or on each connector 160 of the corresponding propeller blade 150.

The propeller assembly may also transition from the flight state, as depicted in FIG. 5B, back to the folded state, as depicted in FIG. 5A, as the propeller assembly 100 driven by the attached motor slows its spin. As such, the centrifugal forces acting on each propeller blade 150 reduce as the propeller assembly 100 slows its rotational spin. Therefore, the directional torque applied by each spring element 210 may exceed the torque generated by the centrifugal forces, which causes each propeller blade 150 to rotate from its position in the flight state to the position in the folded state. Thus, when returning to rest, the propeller blades 150 return to the folded state, thereby achieving a reduced overall footprint.

Additional Embodiment Considerations

The disclosed embodiments of the propeller assembly 100 provide advantages over conventional propellers. Conventional propeller assemblies are typically configured to remain extended in a flight state so that when rotated, the conventional propeller assembly can generate lift to an attached aerial vehicle. However, when unneeded (e.g., at rest), conventional propeller assemblies require significant storage space as the extended propeller blades may be cumbersome and unwieldy to handle.

Propeller assemblies may be further designed to change the configuration of the propeller blades to conserve space when not in use. However, often times these propeller assemblies require manual input from a human to change the configuration of the propeller blades. Human intervention may result in mechanical error during operation of the propeller assembly.

The current disclosed embodiment enables the propeller blades of a propeller assembly to self-fold into a default configuration that reduces the overall footprint of the propeller assembly without the need for human intervention and/or external forces. When required, the propeller blades can naturally extend into a flight state (e.g., extended state) due to in-flight conditions such that the propeller blades can generate lift for the attached aerial vehicle. Therefore, the process of transitioning from a flight state to a folded state (and vice versa) may occur as required by the external conditions and further does not require human intervention.

Throughout this specification, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment," "some embodiments," or "various embodiments" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for propeller blades as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement and details of the apparatus disclosed herein without departing from the spirit and scope defined in the appended claims.

What is claimed is:

1. An unmanned aerial vehicle comprising:
   a propeller blade comprising:
      a hole; and
      a connector located at a root of the propeller blade, the connector including a projection and a shoulder; and
   a central hub comprising:
      an opening configured to receive the projection;
      a portion of a face, wherein the shoulder engages with the portion of the face in a first rotational position of the propeller blade;
      hub holes; and
      a wound torsion spring with a hole;
   wherein the holes of the propeller blade, and the central hub, and the wound torsion spring are concentric so that the propeller blade is movably connected to the central hub via the hub holes,
   wherein the propeller blade is movable within a blade plane between a folded state and a flight state, and
   wherein the blade plane is a plane that the propeller blade moves through during flight of the unmanned aerial vehicle.

2. The unmanned aerial vehicle of claim 1, the wound torsion spring comprising:
   a first spring arm coupled with the connector, and
   a second spring arm coupled with the central hub through the opening,
   wherein the wound torsion spring is configured to rotate the propeller blade relative to the central hub within the blade plane.

3. The unmanned aerial vehicle of claim 1, further comprising:
   a hinge pin configured to extend into the hole of the propeller blade and the central hub to restrict translational displacement between the propeller blade and the central hub.

4. The unmanned aerial vehicle of claim 3, wherein the hinge pin includes threads that connect the hinge pin to the holes of the connector, the central hub, and a wound torsion spring.

5. The unmanned aerial vehicle of claim 2, wherein the opening of the central hub further comprises a cavity, and wherein the second spring arm couples with the central hub within the cavity.

6. The unmanned aerial vehicle of claim 1, wherein the propeller blade is in the first rotational position relative to the central hub when experiencing below a threshold amount of centrifugal force, and wherein the propeller blade is in a second rotational position relative to the central hub when experiencing above the threshold amount of centrifugal force so that the propeller blade moves into the flight state.

7. The unmanned aerial vehicle of claim 1, wherein the central hub includes an attachment point configured to attach the central hub to a motor of the unmanned aerial vehicle.

8. The unmanned aerial vehicle of claim 7, wherein the attachment point includes a screw thread, a snap-fit, or a magnetic attachment.

9. A propeller assembly comprising:
   a first blade movable within a blade plane between a folded state and a flight state, the first blade comprising a first connector comprising a top structure;
   a second blade movable within the blade plane between the folded state and the flight state, the second blade comprising a second connector comprising a top structure; and
   a central hub comprising:
      a first opening configured to receive an end of the first blade and the first connector,
      a face that is configured to contact the top structure of the first connector when the first blade is in the folded state,
      a second opening configured to receive a first end of the second blade and the second connector,
   wherein the face is further configured to contact the top structure of the second connector when the second blade is in the folded state,
   wherein the propeller assembly rotates the first blade and the second blade within the blade plane to create flying conditions, and
   wherein at least a portion of the first blade is nested under the second blade in the folded state.

10. The propeller assembly of claim 9, wherein the first connector is located at a root of the first blade, and wherein the second connector is located at a root of the second blade.

11. The propeller assembly of claim 10, further comprising:
   a first wound torsion spring comprising:
      a first arm coupled with the first connector, and
      a second arm coupled with the central hub through the first opening of the central hub; and
   a second wound torsion spring comprising:
      a first arm coupled with the second connector, and
      a second arm coupled with the central hub through the second opening of the central hub.

12. The propeller assembly of claim 11, wherein the first wound torsion spring provides a torque in a first direction and a centrifugal force, during flying conditions, overcomes the torque from the first wound torsion spring so that the first blade moves opposite the first direction towards the flight state.

13. The propeller assembly of claim 12, wherein the second wound torsion spring provides a torque in a second direction and the centrifugal force, during flying conditions, overcomes the torque from the second wound torsion spring so that the second blade moves opposite the second direction towards the flight state.

14. The propeller assembly of claim 9, wherein the central hub includes an attachment point configured to attach the central hub to a motor of an unmanned aerial vehicle and the motor moves the central hub applying a centrifugal force to the first blade.

15. The propeller assembly of claim 14, wherein the attachment point is located between the first connector and the second connector.

16. A propeller assembly comprising:
   a blade plane;
   a first blade comprising:
      a first connector with a first structure;
   a second blade comprising:
      a second connector with a second structure; and
   a central hub comprising:
      a bottom component;
      a top component connected to the bottom component;
      a first hinge pin extending through the top component and the bottom component at a first end of the central hub to movably connect the first blade to the first end of the central hub so that the first blade is movable within the blade plane between a folded state and a flight state; and
      a second hinge pin extending through the top component and the bottom component at a second end of the central hub to movably connect the second blade to the second end of the central hub so that the second blade is movable within the blade plane between a folded state and a flight state,
   wherein the propeller assembly moves the first blade and the second blade within the blade plane to create flying conditions, and
   wherein the first structure and the second structure contact the central hub when the first blade and the second blade are in the folded states.

17. The propeller assembly of claim 16, further comprising:
   a first spring element and a second spring element comprising: a first arm and a second arm.

18. The propeller assembly of claim 17, wherein the first arm of the first spring element is connected to the first blade and the second arm of the first spring element is connected to the central hub.

19. The propeller assembly of claim 16, wherein at least a portion of the first blade is nested under the second blade in the folded state.

20. The propeller assembly of claim 19, wherein a longitudinal axis of the first blade and a longitudinal axis of the second blade are parallel when the first blade and the second blade are in the folded state and the longitudinal axis of the first blade and the longitudinal axis of the second blade are aligned when the first blade and the second blade are in the flight state.

* * * * *